US010866740B2

(12) United States Patent
Benisty et al.

(10) Patent No.: US 10,866,740 B2
(45) Date of Patent: Dec. 15, 2020

(54) SYSTEM AND METHOD FOR PERFORMANCE-BASED MULTIPLE NAMESPACE RESOURCE ALLOCATION IN A MEMORY

(71) Applicant: Western Digital Technologies, Inc., San Jose, CA (US)

(72) Inventors: Shay Benisty, Beer Sheva (IL); Ariel Navon, Revava (IL); Alex Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 74 days.

(21) Appl. No.: 16/148,748

(22) Filed: Oct. 1, 2018

(65) Prior Publication Data
US 2020/0104056 A1  Apr. 2, 2020

(51) Int. Cl.
G06F 12/00 (2006.01)
G06F 13/00 (2006.01)
G06F 3/06 (2006.01)

(52) U.S. Cl.
CPC .......... G06F 3/0613 (2013.01); G06F 3/0658 (2013.01); G06F 3/0659 (2013.01); G06F 3/0688 (2013.01)

(58) Field of Classification Search
CPC .... G06F 3/0613; G06F 3/0658; G06F 3/0659; G06F 3/0688
USPC ........................................................ 711/103
See application file for complete search history.

(56) References Cited

U.S. PATENT DOCUMENTS

| | | | |
|---|---|---|---|
| 6,314,501 B1* | 11/2001 | Gulick | G06F 9/54 711/153 |
| 7,752,471 B1* | 7/2010 | Kolokowsky | G06F 3/0625 713/310 |
| 9,626,309 B1* | 4/2017 | Burke | G06F 13/1642 |
| 10,025,522 B2 | 7/2018 | Helmick | |
| 10,277,523 B2* | 4/2019 | Wu | H04L 47/70 |

(Continued)

FOREIGN PATENT DOCUMENTS

CN   107346265   11/2017

OTHER PUBLICATIONS

U.S. Appl. No. 15/585,717, filed May 3, 2017.
U.S. Appl. No. 15/810,632, filed Nov. 13, 2017.

Primary Examiner — Sheng Jen Tsai
(74) Attorney, Agent, or Firm — Brinks Gilson & Lione

(57) ABSTRACT

Systems and methods for managing performance and quality of service (QoS) with multiple namespace resource allocation. NVM Express (NVMe) implements a paired submission queue and completion queue mechanism, with host software on the host device placing commands into the submission queue. The memory device processes the commands through various phases including fetching, processing, posting a completion message, and sending an interrupt to the host. NVMe may support the use of namespaces. Namespace configuration may be modified to include performance criteria specific to each namespace. The memory device may then receive commands directed to specific namespaces an apply memory device resources to commands in each namespace queue such that QoS may be applied to control execution of commands such that commands in each namespace receive resources based on host selected performance parameters for each namespace.

20 Claims, 12 Drawing Sheets

(56) References Cited

U.S. PATENT DOCUMENTS

| | | | |
|---|---|---|---|
| 2014/0086000 A1* | 3/2014 | Datla | G11C 5/14 |
| | | | 365/227 |
| 2015/0134857 A1* | 5/2015 | Hahn | G06F 3/061 |
| | | | 710/5 |
| 2015/0224845 A1* | 8/2015 | Anderson | B60G 17/019 |
| | | | 701/37 |
| 2016/0313943 A1* | 10/2016 | Hashimoto | G06F 3/0659 |
| 2017/0199765 A1* | 7/2017 | Ahn | G06F 9/4806 |
| 2017/0300263 A1* | 10/2017 | Helmick | G06F 3/0625 |
| 2018/0095915 A1* | 4/2018 | Prabhakar | G06F 9/455 |

* cited by examiner

SYSTEM AND METHOD FOR PERFORMANCE-BASED MULTIPLE NAMESPACE RESOURCE ALLOCATION IN A MEMORY

BACKGROUND

Non-Volatile Memory Express (NVMe) is a standard for accessing non-volatile storage media attached via a peripheral component interface express (PCIe) bus. NVMe may be used with a variety of non-volatile storage media, such as solid state drives (SSDs). NVMe is based on a paired submission and completion queue mechanism. Commands are placed by hos software into a submission queue. Completions of those commands are placed into the associated completion queue by the memory device controller. Submission and completion queues are allocated either in host memory or device memory. Part of the NVMe standard includes an NVMe virtualization environment. Virtualization environments may use a non-volatile memory (NVM) subsystem with multiple controllers to provide virtual or physical hosts direct I/O access.

A namespace is a quantity of non-volatile memory that may be formatted into logical blocks. An NVMe controller may support multiple namespaces that are referenced using a namespace identifier. An NVMe system may be referred as a multi-user system because it usually contains multiple namespaces that are associated with either single or multiple host processors.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION

Overview

Figure 1A:
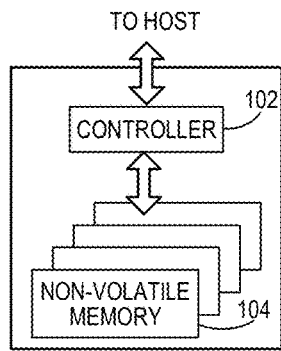
FIG. 1A is a block diagram of an exemplary non-volatile memory system.

As noted above, an NVMe system can contain multiple namespaces that are associated with either single or multiple host processors. In such an NVMe environment, where there are multiple namespaces sharing the same memory device, it would be advantageous to define performance attributes that control the performance (also referred to herein as quality of service (QoS)) for each supported namespace so a host can better utilize memory device resources to provide desired performance. As discussed in greater detail below, embodiments are provided addressing namespace management in a multi-namespace memory device to provide QoS management on the namespace level rather than on a NVMe submission queue level.

A namespace represents a quantity of non-volatile memory that may be formatted into logical blocks. An NVMe controller may support multiple namespaces that are each referenced using a respective namespace identifier. In previous approaches, a memory device generally advertises all supported namespaces when it powers up or initially communicates with a host. Each namespace has its own configurable structural parameters such as namespace capacity, granularity of LBA addressing, metadata and end-to-end capabilities, supported formats and the like. However, in the typical namespace memory arrangement supported by NVMe, there is no ability for the host to configure, or for the memory device to advertise or implement, performance attributes for controlling QoS in the memory device. Typical applications of different namespaces are limited to the configurable parameters attributes noted above, and do not track performance related measures of the different namespaces. Embodiments disclosed herein include a system and method for expanding the ability of the standard namespace commands to include performance parameters that may be advertised to a host and then allow the memory device to track and apply the performance parameters for each namespace to provide the QoS desired by the host for host commands.

As noted previously, the NVMe standard supports an NVMe virtualization environment. In such an implementation, the NVM subsystem within the NVMe virtualization environment may be composed of one or more primary controllers and one or more secondary controllers, where the secondary controllers depend on the one or more primary controllers for dynamically assigned resources. More specifically, the system may comprise a primary function (or master function) and a plurality (e.g., up to 128) virtual functions. The primary and virtual functions may be divided amongst a primary controller and secondary controller(s). Further, in one implementation, the primary and secondary controller(s) may be resident in a single device. Alternatively, the primary and secondary controller(s) may reside in multiple devices. In practice, a host may issue the Identify command to a primary controller specifying the secondary controller list to discover the secondary controllers associated with that primary controller. Further, an NVMe virtualization environment may have multiple (e.g., dozens) of host applications using different virtual functions over the PCIe bus. The various virtual functions may be unaware of other virtual functions that the controllers are performing. In this regard, an NVMe virtualization environment with dozens of host applications using different virtual functions over the PCIe bus may vie for resources and potentially starve more important resources to the various host applications.

In one implementation, Quality of Service (QoS) may be implemented in NVMe environments, including the NVMe virtualization environment, by providing namespace commands that permit a memory device to advertise its performance capabilities and resources in addition to its structural/format capabilities to a host. The host may then define namespaces and different performance parameters for those namespaces based on the advertised capabilities. Generally speaking, QoS may be used to allocate sufficient resources to more important applications (e.g., mission-critical applications) so that the respective transactions can be processed in an acceptable amount of time. In this regard, QoS provides any one of the following benefits: provides the memory device control over resources and allows the memory device to manage with different priorities and resource allocation for each host command; ensures that time-sensitive and mission-critical applications have sufficient resources while allowing other applications access to the media; improves user experience; and reduces costs by using existing resources efficiently.

One measure of QoS is bandwidth, such as the bandwidth directed to the data transfer between the memory device and the one or more hosts (e.g., via the PCIe bus). Typically, the bandwidth between the memory device and the one or more hosts may be limited to a specific data rate (e.g., PCIe gen 4×4 can support a maximum bandwidth of 7.3 GBytes/sec). Thus, in one implementation, the memory device may control the bandwidth as one of the several QoS parameters. One or more other internal performance parameters, including but not limited to error correction requirements, temperature, the number of buffers needed for a command, the number and type of low level NAND operations in a command, and so on, may also be quantified and tracked by the memory device as part of the QoS process described herein.

In a specific implementation, the memory device may advertise its namespace capabilities and performance parameters to the host. The host may then use the namespace information and performance parameters advertised to assign a namespace ID to each command that the host then issues to the memory device based on the QoS the host desires to be applied to the specific command. The host may place its commands in a submission queue with a respective namespace ID the host assigned to it. The memory device may then retrieve the commands from the submission queue and place the retrieved command in the one of the plurality of namespace queues internal to the memory device, and separate from the one or more submission queues from which the host commands are fetched, that corresponds to the namespace ID associated with the command.

In another embodiment, the memory device does not expose or transmit performance parameters to the host. Instead, the host configures and prioritize those namespace in terms of percentage of resources for each namespace at the initialization phase, such as when the host first communicates with the memory device after a power up operation.

For instance, the host may enable three namespaces—A, B and C. Then, the host configures namespace A to get 20% of memory device performance resources, namespace B to get 30% and namespace C to get 50%. In this embodiment, the memory device does not advertise its specific resources and instead the memory device is responsible for executing the host commands it will place in the namespaces according to the host-imposed rules (e.g. basic allocation percentage) to divide up whatever resources the memory device can provide.

The memory device may then manage execution of the commands in each namespace queue by determining the resources necessary to execute the command that is at the head of each namespace queue and comparing that to an amount of resources currently available for that namespace queue. Those namespace queues having sufficient resources currently available may execute the command at the head of those queues, while commands at the head of namespaces queues that currently do not have sufficient resources available are delayed until those resources are replenished. However, in one alternative implementation, the memory device may start the execution of part of a command based on the available tokens even when the available tokens are not sufficient to execute the complete command.

As described in greater detail herein, the resources may be assigned to the different namespace queues by the memory device assigning each queue with a respective different number of resource tokens to spend on commands. Each resource token generated and consumed may be associated with a unit amount of a specific resource, or unit amount of an aggregate amount of resources. Each namespace queue is assigned by the memory device a portion of the resource tokens commensurate with that queue's QoS properties that were set up by the host based on what resources the memory device advertised as available to the host. The commands at the head of each queue may be executed when the resource tokens currently associated with that queue add up to at least the number of resources the particular command needs. The number of tokens needed for the execution are consumed and periodically refreshed for all of the queues in amounts commensurate with the performance (QoS) settings received from the host.

The memory device may thus fetch commands from the submission queue (or submission queues in some embodiments) created by the host without delay and place those commands into the appropriate namespace queue associated with the host-assigned namespace ID identified for that command. The fetched commands in namespace queues that currently have sufficient resource tokens are then executed by the memory device. The memory device may delay execution of commands in other namespace queues that do not currently have enough resource tokens until the resource token count in that namespace queue is replenished to satisfy the resources necessary to execute that command. The resource tokens periodically issued to each namespace queue, and consumed by each command executed in that respective namespace queue, are thus differentiated by the QoS parameters for each namespace queue. This allows the memory device to implement the host generated QoS selections represented by the host selected namespace ID that was assigned when the host placed the command in the submission queue. Commands in the one or more submission queues generated by the host may be executed in an order essentially independent of the submission queue order, and instead be based on the order of commands in the namespace queues, assuming that more than one namespace ID is present in the commands in a submission queue.

In one example where a total power consumption permissible for a memory device is a known fixed amount, power consumption limits may be assigned to the various namespace queues. Although many performance factors may be included, they may all be converted to a power consumption equivalent in one implementation. Each namespace queue may be assigned a power limit amount. In particular, a given namespace queue may be assigned a power consumption limit of X % or Y milliwatts (mW). Likewise, other namespace queues may be assigned various power amounts. In one implementation, the assignment of power consumption limit amounts amongst the different namespaces may, in total, equal the maximum power consumption the device can handle. In one alternative implementation, the assignment of power consumption amounts amongst the different namespaces may, in total, be less the maximum power consumption. In another alternative implementation, the assignment of power consumption amounts amongst the different namespaces may, in total, be greater the maximum power consumption. In this case, the namespace that first claims or appropriates this power consumption may be entitled to this power consumption. In practice, the commands to be executed in the namespace queues (e.g. those at the heads of their respective namespace queues) may be compared with the assigned power consumption amounts to determine whether those commands exceed the assigned power consumption amount. If so, the memory device may temporarily delay executing the command at the head of particular namespace queues.

The amount of power consumed may be expressed in one of several ways. For example, the amount of power consumed may be expressed as a number of low-level NAND operations, number of memory buffers required, ECC or security requirements, bandwidth or other performance parameters, with the value of the operations or parameter indicative of (and convertible to) the amount of power consumed. Bandwidth as used herein, refers to command size. For example a command size of 1 gigabyte (GB) requires some bandwidth in order to transfer that 1 GB on the host interface.

The power consumption value may be adjusted or modified based on the commands executed (which results in an adjusted or modified token count as tokens are consumed). In practice, the value of the various power consuming resources needed to execute a command may be compared with the assigned number of tokens for the particular namespace queue (the tokens representing the QoS assigned to that namespace queue) to determine whether the value of the necessary resources for command execution exceeds the assigned power consumption amount (represented by the number of available tokens for the namespace).

The power consumed, as indicated by the token value needed to execute the command, may depend on the type of commands in the namespace queues. As one example, different types of commands may have different power consumption needs based on the number of NAND operations that the command represents. In particular, a write command (with X amount of data to write to non-volatile memory) may have a greater effect on power consumption than a read command (also with X amount of data to read from non-volatile memory). In that regard, the memory device may adjust the value of the tokens that are available to the namespace queue depending on whether the command to be executed from that queue is a write command or a read command.

The memory device may determine how long to delay executing commands from a particular namespace queue of the command in several ways. For example, the memory device may allocate more tokens to the different namespace queues at predetermined intervals (e.g., every 1 mSec). Further, the amount of tokens allocated at the predetermined intervals may depend vary depending on the different QoS assigned by the host to a given namespace (e.g., a first namespace may be allocated more tokens than a second namespace). As discussed in more detail below, when sufficient tokens are available, the namespace queue(s) allocated the tokens may be re-enabled to execute commands that were being delayed because prior command executions for the queue had reduced or exhausted the number necessary to permit execution of the next command for execution in that queue.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
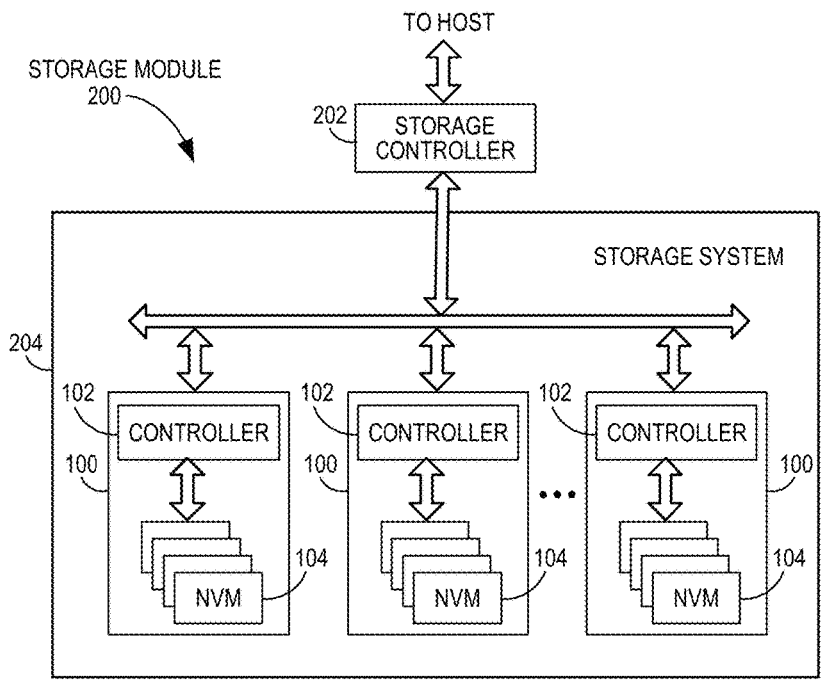
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, a Universal Serial Bus (USB) interface, or a fabric transport interface, as examples. The storage system 200, in one embodiment, may be a solid state drive (SSD), such as found in portable computing devices, such as laptop computers and tablet computers, and mobile phones.

Figure 1C:
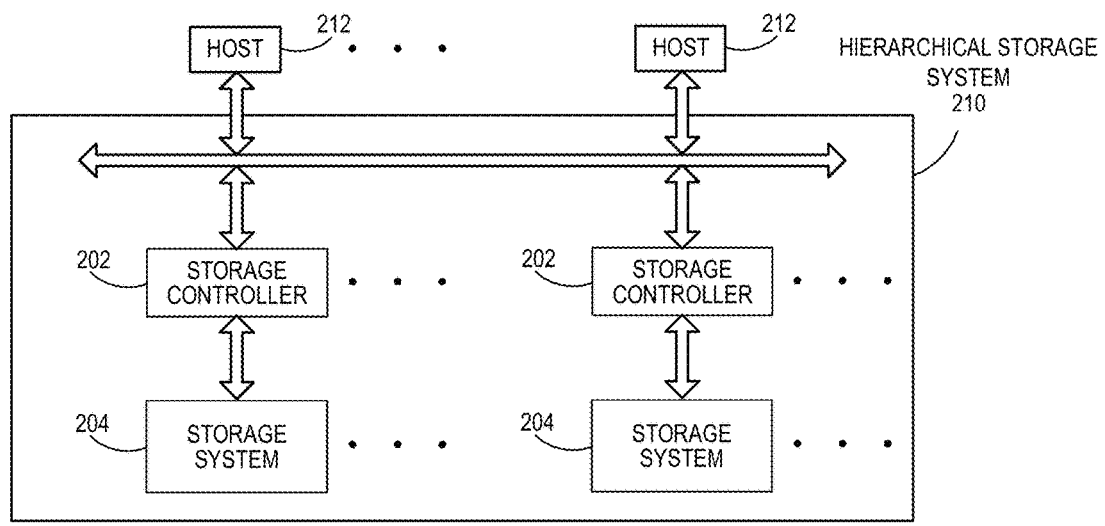
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
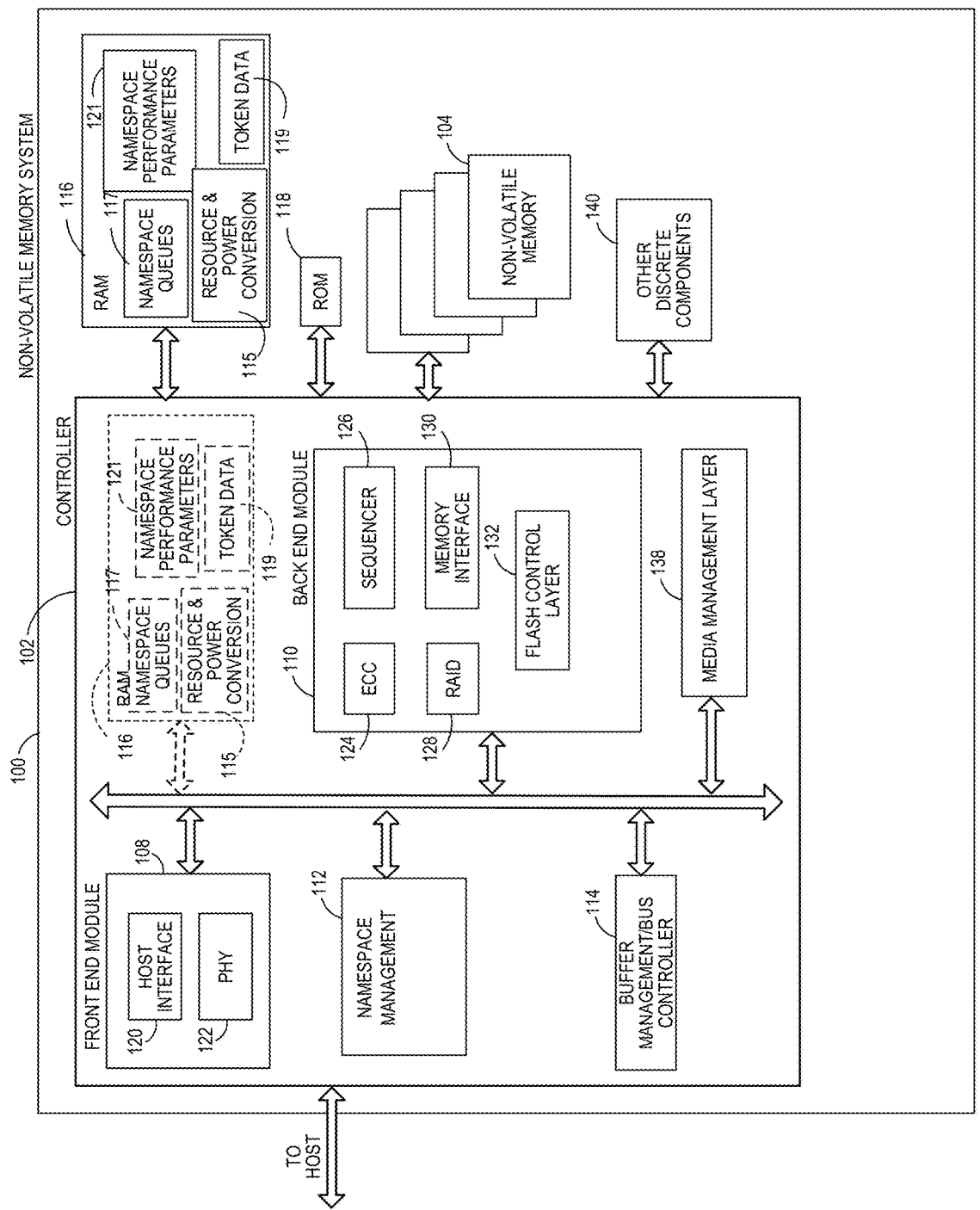
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

As discussed below, in one implementation, the submission queues and the completion queues may be stored in the Controller Memory Buffer, which may be housed in RAM 116. Additionally, a set of one or more performance resource and power conversion data structures 115, such as tables, may be stored in RAM 116 or other memory. The data structures 115 may include a table for determining the different types of individual resources (e.g., the number of buffers, types of NAND commands, error correction requirements and so on) that a particular host command (e.g., write, read or other host command) will need. The data structures 115 may also include a table for converting those different types of individual resources determined from the resource table into an equivalent power usage amount associated with consumption of that individual resource.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for a high capacity memory device (e.g., greater than 32 gigabytes (GB)) may be too large to store in SRAM, and may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Other modules of the non-volatile memory device 100 illustrated in FIG. 2A may include a namespace management module 112 configured to identify which namespace a command fetched from a submission queue is assigned to, place commands in the appropriate namespace queue, determine and score the resources a particular command needs in a namespace queue, and track and apply the namespace performance parameters assigned to each namespace queue to commands in the respective namespace queue to determine whether to execute or delay execution of commands based on the memory device resources currently available to each namespace queue. The namespace queues 117 may be stored in volatile memory such as RAM 116, along with the namespace performance parameters 121. As described more below, the controller 102 may also utilize the namespace module 112 to advertise the namespace capabilities and performance parameters available and implement the namespace management a host selects to implement based on the advertised performance capabilities and parameters.

Figure 2B:
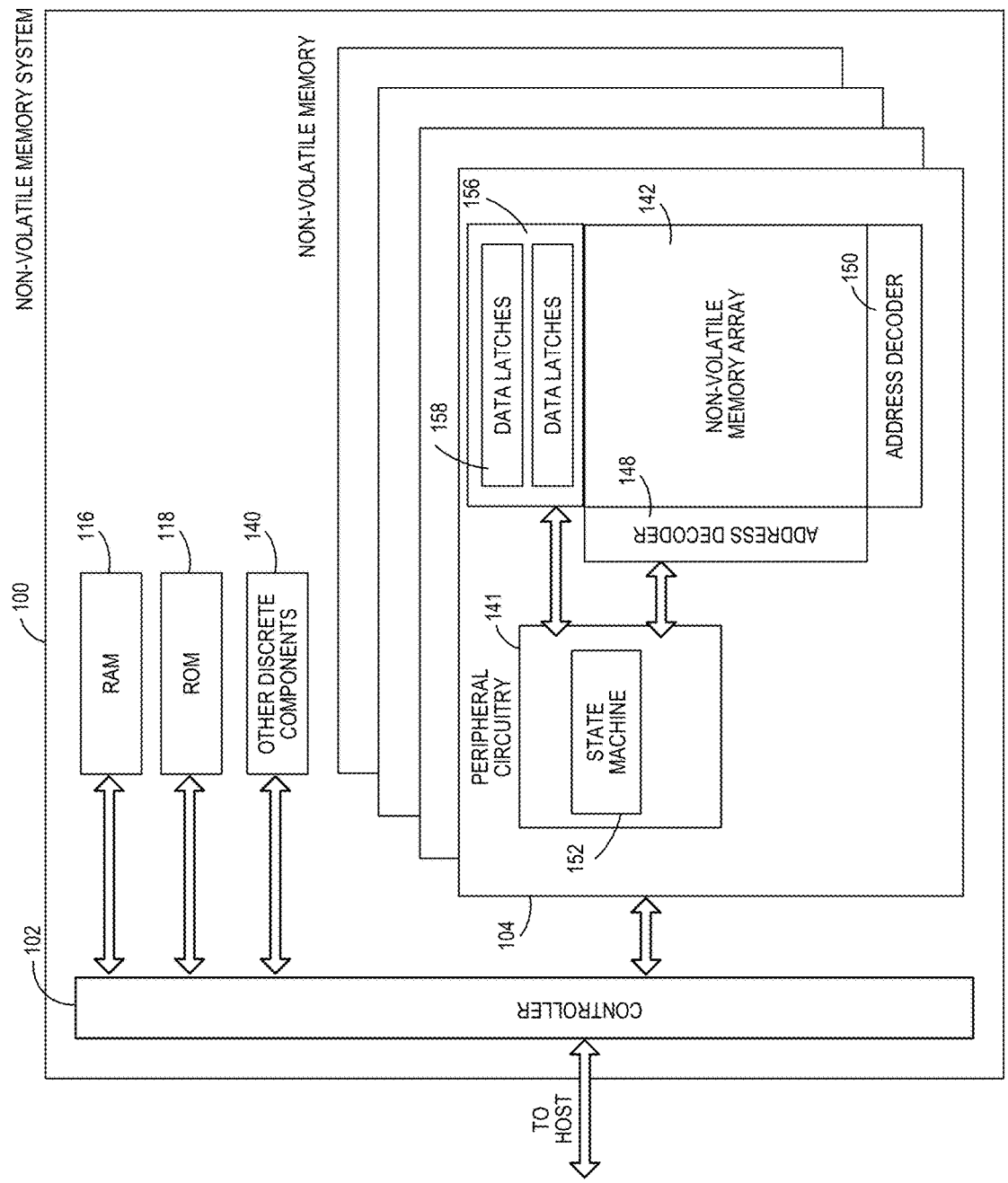
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include peripheral circuitry 141 and a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include word lines and bit lines connected to the FGTs. Each page of FGTs is coupled to a word line. In particular, each word line may be coupled to the control gates of FGTs in a page. In addition, each string of FGTs may be coupled to a bit line. Further, a single string may span across multiple word lines, and the number of FGTs in a string may be equal to the number of pages in a block.

The non-volatile memory die 104 may further include a page buffer or data cache 156 that caches data that is sensed from and/or that is to be programmed to the memory array 142. The data cache 156 comprises sets of data latches 158 for each bit of data in a memory page of the non-volatile memory array 142. Thus, each set of data latches 158 may be a page in width and a plurality of sets of data latches 158 may be included in the data cache 156. For example, for a non-volatile memory array 142 arranged to store n bits per page, each set of data latches 158 may include N data latches where each data latch can store 1 bit of data.

The non-volatile memory die 104 may also include a row address decoder 148 and a column address decoder 150. The row address decoder 148 may decode a row address and select a particular word line in the memory array 142 when reading or writing data to/from the memory cells in the memory array 142. The column address decoder 150 may decode a column address to select a particular group of bit lines in the memory array 142 to be electrically coupled to the data cache 144.

In addition, the non-volatile memory die 104 may include peripheral circuitry 141. The peripheral circuitry 141 may include a state machine 152 that provides status information to the controller 102. Other functionality of the state machine 152 is described in further detail below.

Figure 3:
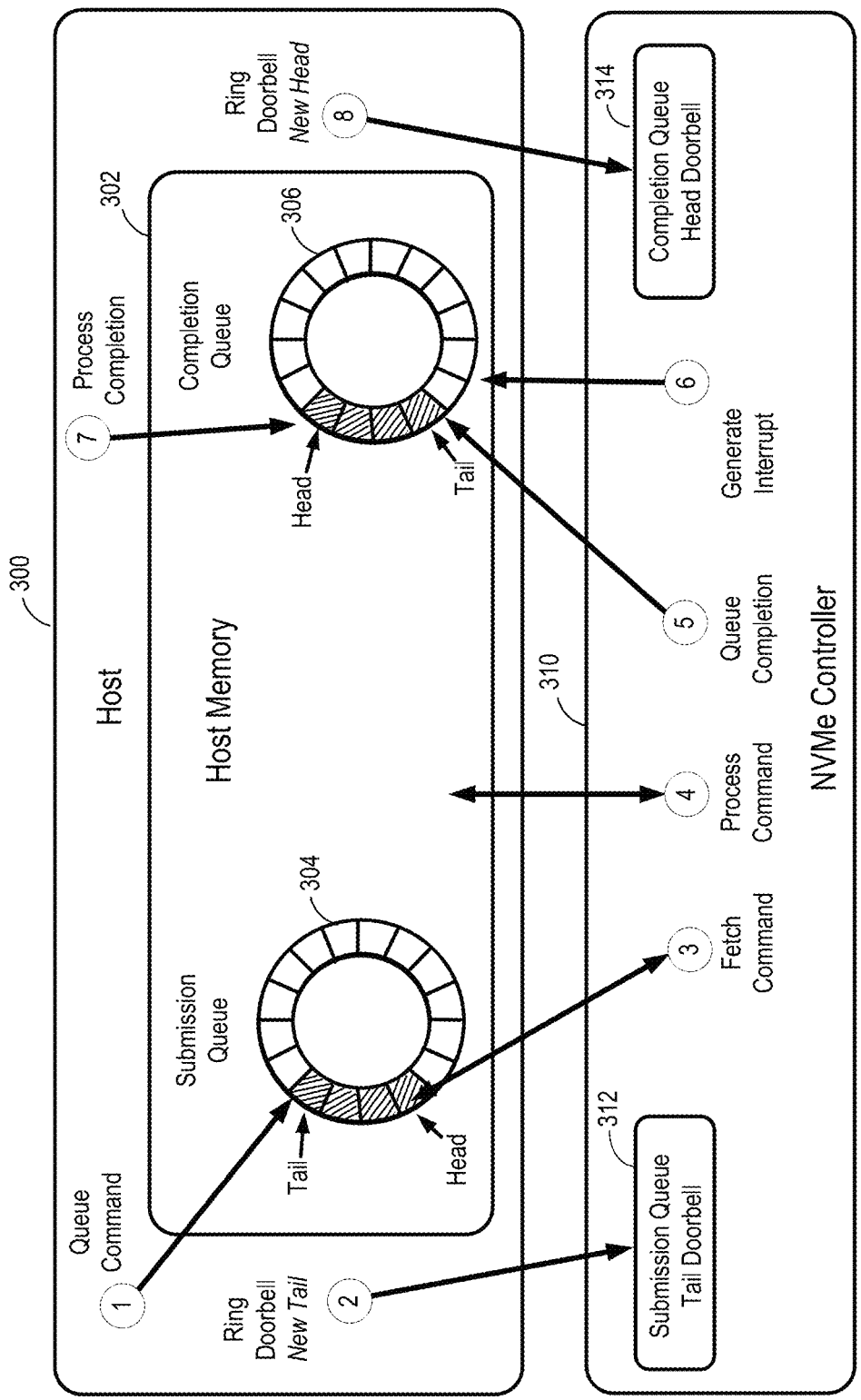
FIG. 3 is a block diagram of the host device and NVMe controller illustrating a sequence for a host device and a memory device to request and process an NVMe command.

As discussed above, NVMe is a standard for accessing non-volatile storage media attached via PCI Express (PCIe) bus. FIG. 3 illustrates a sequence of steps for executing a command via the NVMe standard. The NVMe standard discloses a scalable host controller interface designed to address the needs of Enterprise and Client systems that utilize PCI Express-based solid state drives. Such systems are based on a paired submission queue and completion queue mechanism.

As shown in FIG. 3, a host device 300 includes host memory 302, and the memory device includes a controller, such as an NVMe controller 310. In the implementation illustrated in FIG. 3, the host memory 302 includes a submission queue 304 and a completion queue 306. Further, in one implementation, the submission queues and completion queues may have a 1:1 correlation. Alternatively, in embodiments, the submission queues and completion queues do not have a 1:1 correlation.

In practice, at the initialization phase, the host device 300 may instruct the memory device to create the submission queue(s) and corresponding completion queue(s) in a memory resident in the memory device, such as a controller memory buffer.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After the submission queue(s) are created, the host device 300 may write a command (or several commands) to the submission queue. This is indicated in FIG. 3 as step 1, labeled "Queue Command". In particular, FIG. 3 illustrates that four commands were written to the submission queue. In step 2, the host device 300 writes to a submission queue tail doorbell register 312 in the memory device. This writing to the submission queue tail doorbell register 312 signifies to the memory device that the host device has queued one or more commands in this specific submission queue 304 (e.g., 4 commands as illustrated in FIG. 3). After which, the memory device writes the command to the submission queue.

Although the simplified illustration of FIG. 3 shows a single submission queue 304 and single completion queue 306, there may be several submission queues (with potentially many pending commands in the several submission queues) in different implementations. Thus, before performing step 3, the memory device controller may arbitrate between the various submission queues to select the particular submission queue from which to fetch the command(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may use one or more arbitration schemes, such as round-robin, weighted round robin, etc. in order to determine which commands to fetch from the submission queue(s). Discussion of various arbitration schemes are disclosed in U.S. patent application Ser. No. 15/585,717, which is hereby incorporated by reference herein in its entirety. Further, the memory device may access the base address of the particular submission queue 304 plus the pointer on the current head pointer implemented in the host device 300.

At step 4, the memory device processes the command. In one implementation, the memory device parses the commands, and determines the steps to execute the commands (e.g., read/write/etc.). For example, the command may comprise a read command. In the NVMe base specification, responsive to receipt of the read command, the memory device parses the read command, implements the address translation, and accesses the non-volatile memory to receive the data. After receiving the data, the memory device may perform error correction on the data accessed from non-volatile memory. Thereafter, the memory device may cause the error-corrected data to be stored on the host device based on information in the command (e.g., the PRP1 discussed below). In particular, the PRP1 may define the location (e.g., the address range) of the host command data buffer that resides on the host. As another example, the command may comprise a write command. In the NVMe base specification, responsive to receipt of the write command, the memory device parses the write command, determines the location of the data on the host device subject to the write, reads the data from the location on the host device, and writes the data to flash memory.

After completing the data transfer, at step 5, the memory device controller sends a completion message to the relevant completion queue 306. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSI-X (message signal interrupt extension) interrupt. The interrupt indicates to the host device that there is an entry on the completion queue 306. As discussed in more detail below, in one implementation, the memory device may use the host command data buffer until the memory device notifies the host device at step 6 that there has been an update to the completion queue 306.

Responsive to receiving the interrupt, the host device 300 determines that there are one or more completion entries pending for the host device 300 in this completion queue 306. At step 7, the host device 300 then processes the entries in the completion queue 306.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

As discussed above, the NVMe standard includes an NVMe virtualization environment. As one example, the NVMe virtualization environment may have a plurality, such as dozens, of host applications using different virtual functions over the PCIe bus. In this regard, the memory device is configured to include a QoS methodology to manage the NVMe virtualization environment. In particular, the QoS methodology disclosed herein may allow each NVMe primary or virtual function to designate a particular QoS treatment in the memory device by selecting which namespace to assign each host command, where each namespace queue is known to have certain performance parameters such as being assigned a portion of the overall bandwidth or a priority or latency, as discussed in further detail below. Thus, the QoS methodology may avoid a specific host application being perpetually denied necessary resources to process its respective work.

Figure 4:
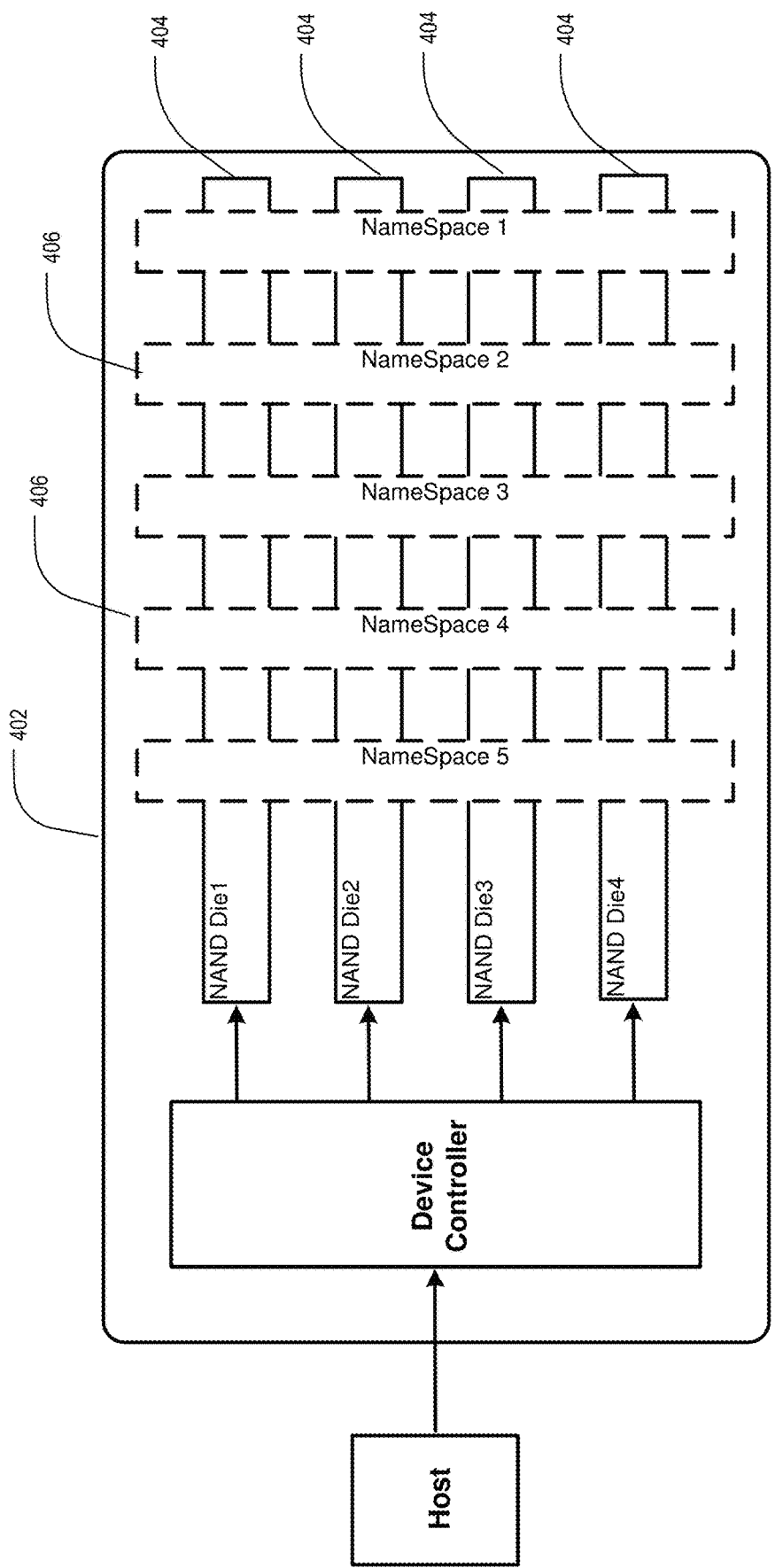
FIG. 4 is a block diagram of a memory device with multiple namespaces.

FIG. 4 illustrates an example structure of a multi-namespace memory device 402. In this illustration, the memory device 402 is a simplified view of the NVM system 100 of FIG. 2A and illustrates four NAND dies 404 and five namespaces 406. Each namespace 406 is implemented in all supported four NAND dies 404, such that blocks of logical space from each of the four NAND die 404 may be part of each namespace 406.

Figure 5:
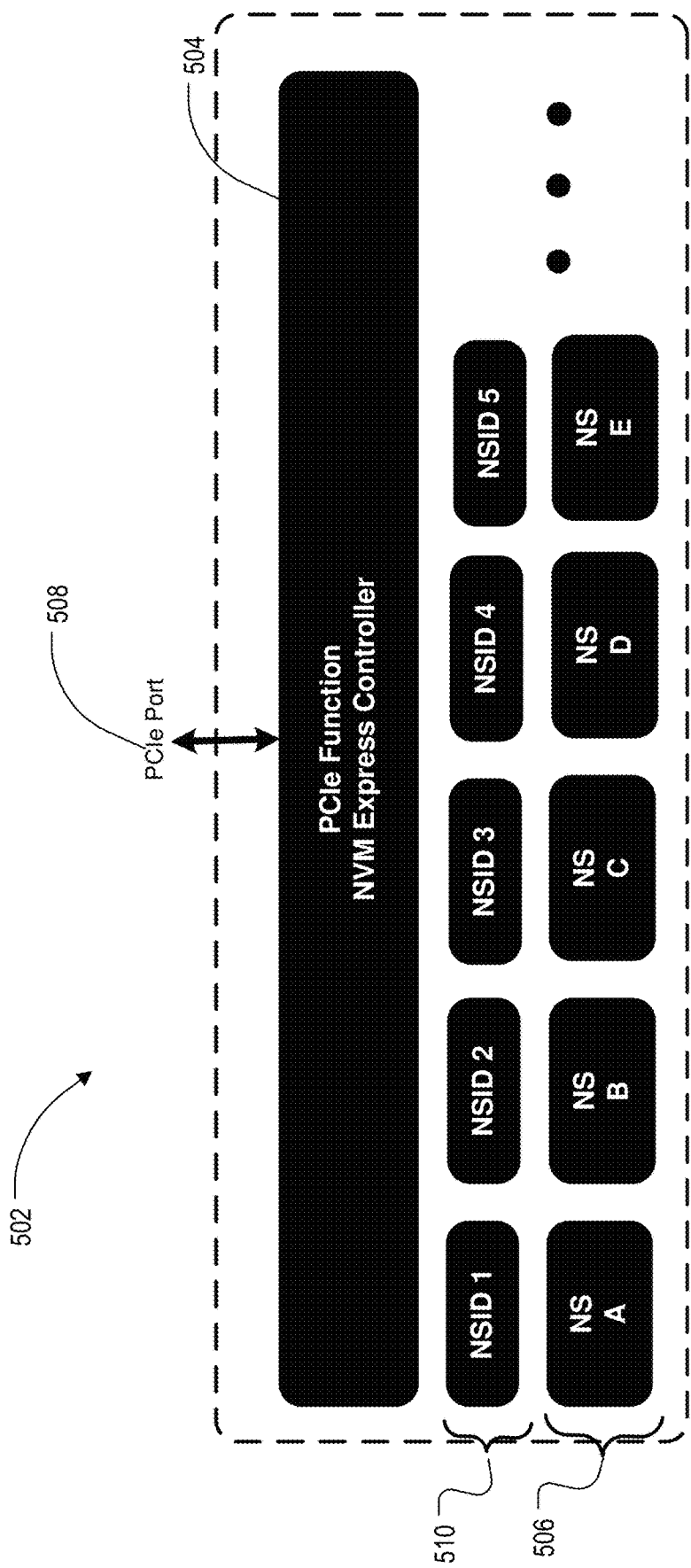
FIG. 5 is a block diagram of the memory device of FIG. 4 showing a single NVMe controller configuration.

FIG. 5 is a functional diagram of a memory device 502 that is an NVMe implementation of the memory device 402 of FIG. 4. Memory device 502 is arranged with a single NVMe controller 504 and a single PCI Express port 508. Since memory device 502 is a single function PCIe device, the NVMe controller 504 is associated with a single PCIe Function 0. The NVMe controller 504 in this example supports 5 namespaces 506 labeled NS A, NS B, NS C, NS D and NS E. Associated with each namespace 506 is a namespace ID 510, labeled as NS ID 1, NS ID 2, NS ID3, NS ID 4 and NS ID 5, respectively, that is used by the NVMe controller 504 to reference a specific namespace 506. The namespace ID 510 is distinct from the namespace 506 itself and is the identifier a host and NVMe controller 504 use to specify a particular namespace 506 in a host command. In this example, NS ID 1 is associated with NS A, NS ID 2 is associated with NS B and so on. Although the memory device 502 is shown with a single NVMe controller and a single PCIe port for simplicity of illustration, embodiments of memory devices with arrangements of multiple PCIe ports and/or multiple NVMe controllers or PCIe functions are also contemplated that may also utilize the techniques of namespace control of QoS described herein. Additionally, any number of namespaces and namespace IDs may be implemented in different implementations.

In one embodiment, in order to manage allocation of resources in a memory device using command selection from namespace queues in the memory device, the number of namespaces supported by the memory device, and the performance parameters specifically associated with the different namespaces, need to be defined for the memory device. Once defined for the memory device, the namespace IDs and the associated performance parameters need to be advertised to any host that uses the memory device. Once a host is aware of the namespace IDs and the respective performance parameters supported for each namespace ID, the host may then include assign different namespace IDs to the commands it places into the submission queue(s) so that, when the memory device retrieves each command from the submission queue(s), the memory device may place the retrieved commands into internally generated namespace queues associated with the respective namespace IDs and then apply the performance parameters associated with that namespace to the retrieved commands to select which commands to execute.

The types of internal resources for a memory device that relate to memory device performance parameters or QoS may vary somewhat and depend on the particular memory device. However, in a typical memory device resources that may be used include bandwidth for executing a command, the number or type of low-level NAND operations needed to execute a particular command, security operations available for a command (such as encryption/decryption and strength of the encryption), the number and/or location of buffers in controller memory for executing a command, the current temperature of the memory device, the available power for the memory device and error correction operations needed to execute the command. This is simply a non-exhaustive list of some common memory device resources that host commands consume that may be assigned differently to different namespaces in a memory device. In one implementation, existing namespace identification commands may be modified to allow a memory device to include advertise namespace performance and resource capabilities, so that a host device may format or initialize a memory device with a namespace management command to include a desired number of namespaces and associated structural and performance parameters selected from the advertised performance capabilities.

Figure 6:
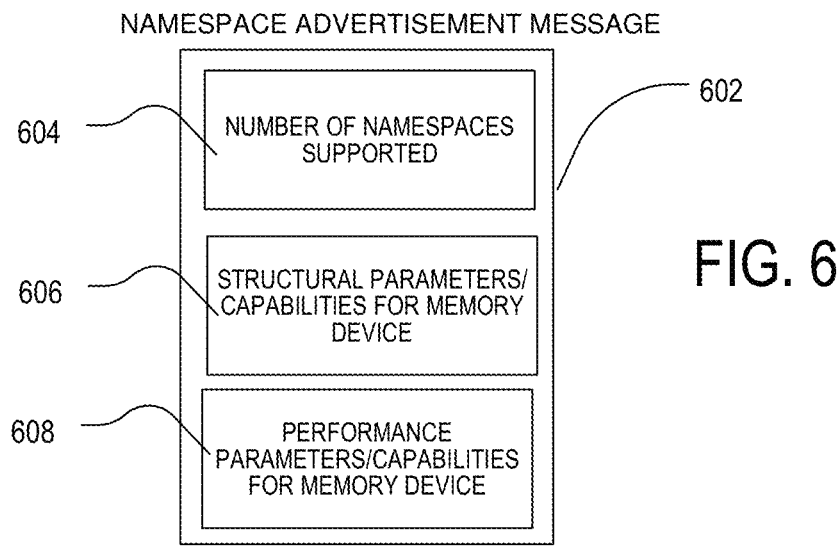
FIG. 6 is a diagram of an embodiment of a namespace advertisement message having fields for advertising memory device performance capabilities.
Figure 7:
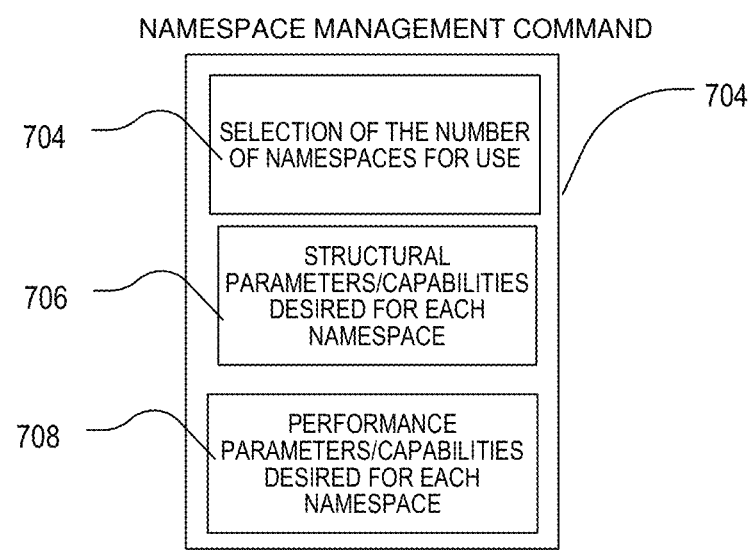
FIG. 7 is a diagram of an embodiment of a namespace management message having fields for configuring namespaces in a memory device based on selected performance capabilities.

Referring to FIG. 6, an example namespace advertisement message format is shown for a resource advertisement message 602 that may be transmitted from a memory device to a host in response to an initial namespace query from the host, for example in response to a namespace identification (namespace ID) command from the host. The namespace advertisement message 602 may include the number of namespaces supported 604, structural attributes available for configuration for each namespace 606, and performance attributes available for configuration for each namespace 608. Referring to FIG. 7, an example namespace management command 702 is shown that may be transmitted by the host to the storage identifying the desired number of namespaces 704, structural configuration 706 and performance attributes 708 for the different namespaces the host wants to use based on the available configurable structural and performance resources advertised to the host in the initial namespace advertisement message 602. Once this exchange of information between the host and the memory device has taken place, the host can subsequently select the QoS treatment of each command it issues by associating its commands with the namespace ID having the performance attributes it has selected.

The structural parameters advertised and selected may be any of a number of standard namespace structural features such as namespace capacity, the logical block address (LBA) granularity of data (for example 512 bytes or 4 kbytes of data per LBA), the metadata amount associated with each unit of data and so on. The different performance parameters and capabilities of the memory device designated for each respective namespace may be any of a number of command execution performance features such as guaranteed performance, latency and/or priority to be given to commands in a particular namespace. The guaranteed performance may be broken down into one or more specific performance parameters such as bandwidth capability, power, share of NAND operation capability and other types of performance parameters noted herein.

The advertisement and configuration messaging may be accomplished using spare bits or unallocated fields in any of a number of existing administrative commands, such as existing namespace advertisement or management commands that handle structural parameter advertising or formatting for namespaces may be used to modify those commands to include the desired performance parameters for a namespace advertisement message 602 or namespace management command 702 such as shown in FIGS. 6-7. Alternatively, the exchange of resource capability and host-desired namespace performance settings based on those resource capabilities may be implemented in any of a number of other ways, such as by modifying vendor specific command, vendor-specific registers, a sideband interface or NVMe management interface commands.

Figure 8:
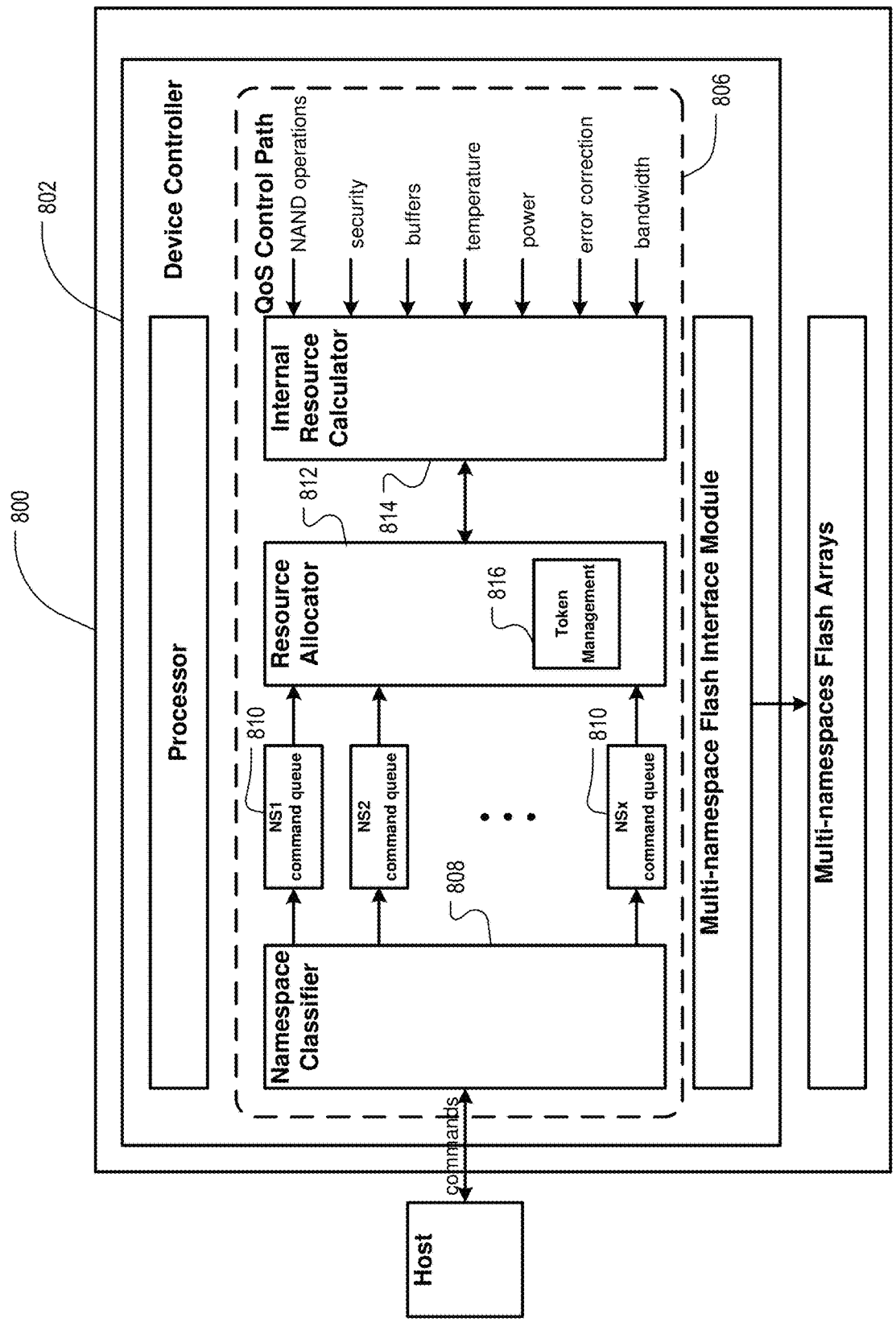
FIG. 8 is an embodiment of the memory device of FIG. 2A-2B illustrating a functional flow for managing quality of service in multiple namespaces.

Referring now to FIG. 8, a system block diagram is shown that illustrates an embodiment of a QoS control path 806 in a memory device 800 to manage QoS with namespace management. As discussed above with regard to FIG. 2A, the memory device may include a namespace management module 112. Namespace management module 112 may be implemented either in firmware or in hardware, and may be optimized for NVMe virtualization, as discussed herein. Namespace management module 112 may manage QoS among the various NVMe users (hosts or NVMe functions) by applying memory device resources to obtain the performance each namespace queue in the memory device is assigned. The system block diagram of FIG. 8 may represent a functional implementation of the NVM system 100 of FIGS. 2A-2B, where the tasks illustrated along the QoS control path 806 may be implemented by the controller 102 via the namespace management module 112. As shown in FIG. 8, the memory device 800 may include a namespace classifier 808 that, when a host command is fetched from a submission queue by the controller 802, identifies the namespace ID assigned to the command by the host. The host and the memory device 800 communicate with each other using a host interface protocol, for example the NVMe protocol discussed previously. Whenever fetching a command from a submission queue, such as described in the example of FIG. 3, the controller 802 first classifies the command based on the associated namespace ID and queues that retrieved command in the relevant namespace (NS) command queue 810 associated with that namespace ID.

The namespace IDs (NS1, NS2, . . . NSx), the performance parameter settings for the namespace command queues associated with each namespace ID, and the namespace queues themselves may be stored in volatile memory, such as RAM 116 (FIG. 2A). The namespace IDs and performance parameter settings are those that were previously configured through the process of the memory device 800 advertising capabilities and the host selecting from those capabilities as described with reference to FIGS. 6 and 7.

Before executing a command, memory device first determines whether the QoS algorithm allows the controller 802 to execute the command at this point or whether the execution is to be delayed. The memory device 800 first evaluates the required resources for executing the command with a resource allocator 812. Then, controller 802 may score this command in terms of weighted average of required resources using an internal resource calculator 814. The internal resource calculator 814 may track the usage and availability of each of a plurality of performance parameters. These parameters may include the number of low level NAND operations, security requirements (e.g. encryption/no encryption, encryption key type, etc.), number of buffers in the memory device needed, current device temperature (which may be used to determine if more power is needed for the command), power consumption, type of error correction and bandwidth. Next, when sufficient resource tokens are available, as tracked by a token management module 816, the command will start the execution phase. Otherwise, the execution of the command will be delayed until enough resource tokens have been accumulated for the relevant namespace ID.

Thus, in one implementation, the QoS algorithm that is used to control performance provided to commands is a token-based system. The tokens may be allocated to the namespaces from time to time, for example at fixed periods of elapsed time, based on the QoS requirements for the particular namespace. The higher the quality of service required for a specific namespace, the more tokens it will get during the same period. A command (or part of a command as described in alternative embodiment below) may start the execution phase when the particular namespace ID currently has sufficient tokens for starting the execution phase of this command. The tokens are consumed when deciding to start the execution of the command.

Figure 9:
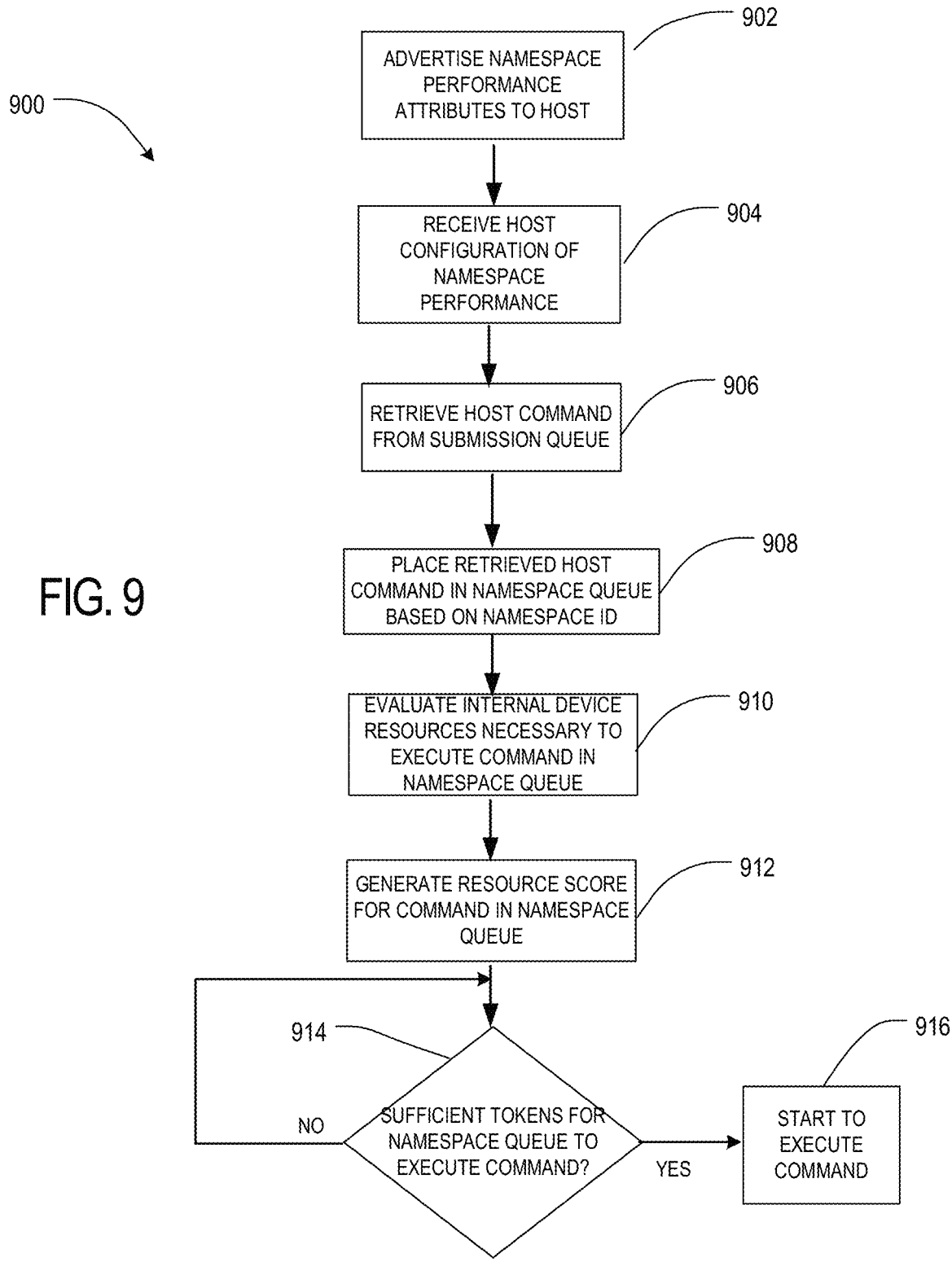
FIG. 9 is a flow chart of an embodiment for implementing QoS in a multiple namespace memory device.

An overall flow 900 of an embodiment of the method of managing performance in a multi-namespace memory system such as disclosed above is shown in FIG. 9. As shown in FIG. 9, a method for providing QoS levels to host commands using namespace management of memory device resources includes: namespace performance capability advertisement, namespace management by the host to select the namespaces and performance from the advertised capabilities, namespace classification by the memory device to classify host commands retrieved from the one or more submission queues with the appropriate namespace, resource evaluation to determine what resources each specific retrieved host command needs, resource scoring to sum up the total resource usage for that evaluated command and then management of command execution based on the namespace the command resides in and the resources available to that namespace.

The initial steps of namespace management include the advertisement by the memory device of the namespace performance attributes available for the memory device (at 902). Using a namespace management command or commands to select namespaces and performance features from those advertised, the host may then select and configure desired namespaces and namespace performance of each of those namespaces (at 904). These namespace management steps may be accomplished using messages such as described with respect to FIGS. 6-7.

Once the namespace IDs and performance attributes are set up, the memory device 800 may retrieve host commands from the submission queue generated by the host (see submission queue 304 and command fetch process of FIG. 3), in the order they are organized in the submission queue, and perform namespace classification to identify the appropriate namespace command queue for the retrieved command (at 906). The controller 802 may use the namespace classifier 808 to identify the namespace ID, where the 802 controller may parse the retrieved command for the host-assigned namespace ID associated with the retrieved command. The controller 802 places each retrieved command from the submission queue into the appropriate namespace command queue in the memory device 800 associated with its host-assigned namespace ID (at 908). The namespace command queues (also referred to herein as namespace queues) 810 may be stored in volatile memory 116 or other type of memory in the memory device 100.

Figure 10:
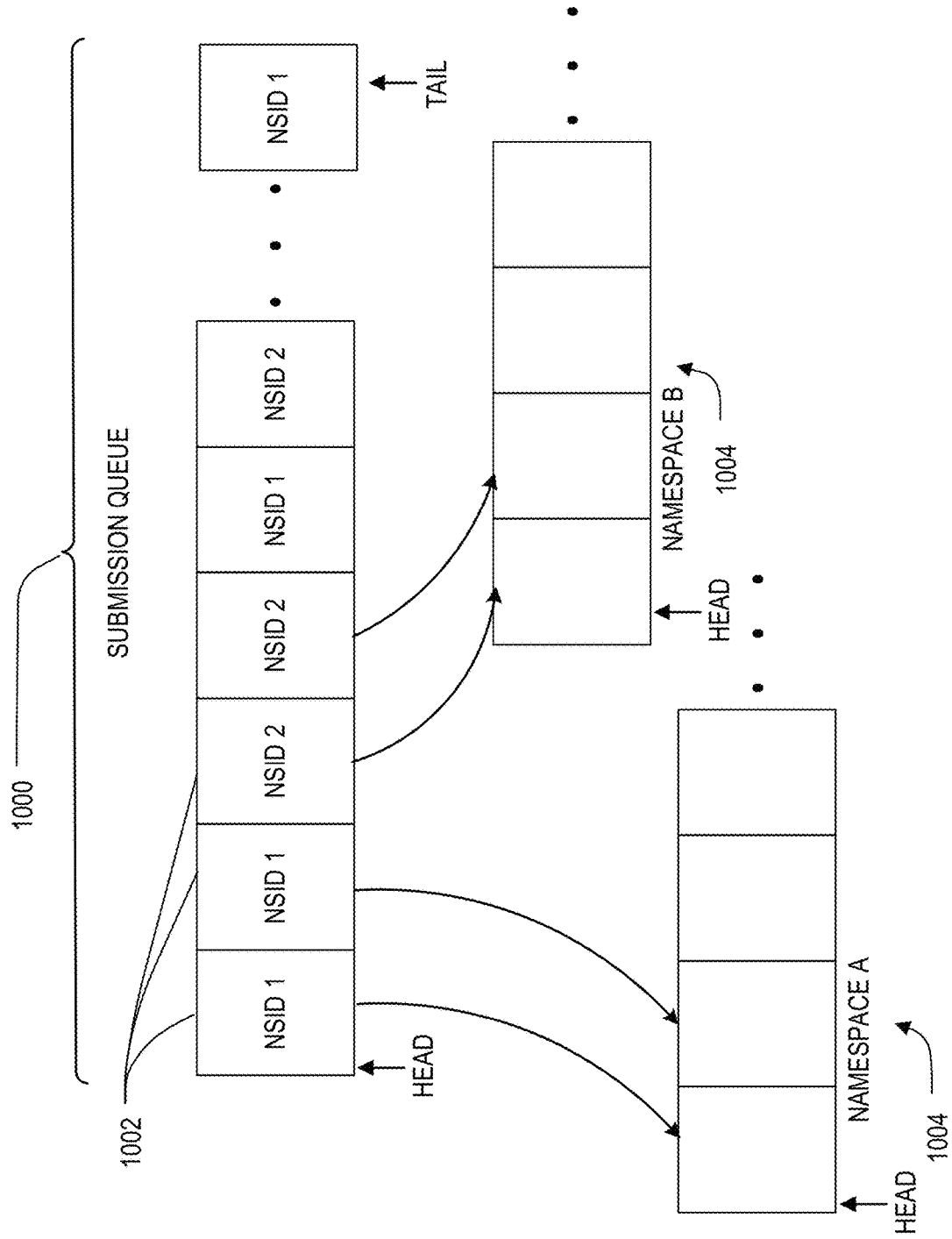
FIG. 10 illustrates movement of host commands from a submission queue to namespace queues according to one embodiment.

Referring briefly to FIG. 10, a simplified illustration of a possible distribution of host commands 1002 in a submission queue 1000 and the resulting placement of those commands 1002 into the namespace queues 1004 is shown. Each command 1002 in the submission queue 1000 is associated with a host-assigned namespace ID (in this example, NSID 1 or NSID 2) and each host command 1002 is retrieved in submission queue order from the current head of the submission queue 1000 to the tail and placed in the respective namespace queue 1004 in the memory device. In this example, namespace queue A is identified by NSID 1 and the namespace queue B is identified by NSID 2. As illustrated in the simplified example of FIG. 10, the original order of host commands in the submission queue is changed when the commands are retrieved, evaluated for their respective namespace IDs and then sorted into the namespace queues associated with the identified namespace ID. As becomes more apparent below, despite fetching the commands in submission queue order, the ultimate order of execution of the commands 1002 fetched from the submission queue 1000 is based more on the resulting order of the commands after placement in the appropriate namespace queue 1004 and ultimately on the current resources available to each namespace queue relative to the specific resource needs of the particular command currently at the head of each namespace queue 1004.

Referring back to FIG. 9, after the controller 802 places each retrieved command from the submission queue into the appropriate namespace command queue (at 908), the controller 802 may then evaluate a command in the namespace queue to determine the number of memory device resources needed to execute the particular command. In one embodiment only the commands currently at the head of each namespace queue are each evaluated, and they may be evaluated in parallel or serially in different implementations, by the internal resource calculator to determine the specific resources that those commands will need to complete execution (at 910). In one implementation, to determine the number of memory device resources, the controller 802 may use the internal resource calculator 814 to compile resource needs based on one or more of the type of command (e.g., write command or read command) and the size of the command, the type of security associated with the command (e.g., if there is an encryption requirement and what type of encryption key), the error correction code (ECC) type and strength associated with the command, the bandwidth needed for the command and/or other resources that will be used for the command. The internal resource calculator 814 may look up in a memory of the memory device the type of command (read, write, etc.) and map that to the specific resources, such as the number and/or type of low-level NAND operations (e.g., sense, erase, program, etc.) that are associated with the type and size of the command, as well as any to any other resources (security, ECC, buffer use, bandwidth) that the memory device will consume to execute the type and size command.

After looking up the various resources the command in the namespace queue requires, the internal resource calculator 814 may then convert the determined amount of resources for each command at the head of a respective namespace queue into a resource score (at 912). The controller 802 can use the calculated resource score to decide whether to execute that command in view of the specific resources currently available for the specific namespace ID of the namespace queue. In one embodiment, the resource score generated by converting each resource determined to be needed for that command into a power consumption equivalent and summing the power consumption equivalents for each of the resources into a total score. The power consumption equivalents for consuming a particular resource may be predetermined measurements stored in a power equivalent data structure, such as a database or table, in non-volatile or volatile memory in the memory device. The internal resource calculator 814, for every determined resource to execute the particular command, whether it be the number of memory buffers necessary or the need to apply a particular strength of security or error correction, may look up in the power equivalent data structure the power equivalent for the determined resource. The internal resource calculator 814 would then store a sum of the power consumption equivalents for all the determined resources of that command.

When the sum of the power consumption equivalents for all the determined resources of that command is calculated, then the controller 802 of the memory device may determine whether the namespace queue associated with that command currently has access to a sufficient amount of the memory device resources to execute a command needing that calculated amount of power. The current memory device resources available to each namespace may be tracked in terms of renewable tokens (also referred to herein as resource tokens or simply, tokens). The renewable tokens are divided up among the namespace queues in an amount corresponding to the QoS (performance) previously selected by the host for each namespace and consumed when a command from the queue is executed.

In this example, each token may represent a unit of power consumption and may be distributed to each namespace according to the relative performance previously selected by the host for each namespace. Thus, the total number of tokens distributed among the namespace IDs may represent the total amount of power consumption that the memory device is capable of. The tokens may be apportioned to each namespace by a token management module 816 in an amount corresponding the QoS/performance selection previously made by the host for each namespace. In the simplified two namespace system of FIG. 10, the host may originally select to configure the first namespace 1004 (namespace A) to be a higher priority namespace, for example with 70% of the memory device resources, and the second namespace 1004 (namespace B) to be a lower priority namespace, for example with 30% of the memory device resources. In this example, the token management module 816 would assign 70% of new resource tokens to namespace A and 30% of the new resource tokens to namespace B such that the QoS for each namespace is represented by a respective portion of the total available resources (for example power consumption) supported by the memory device.

As shown in FIG. 9, if the power consumption needed for execution of the command at the head of a namespace queue is less than or equal to the current power consumption resources of that namespace queue as represented by the number of tokens the namespace queue currently has, then the memory device 800 executes that command (at 914, 916). Upon execution, that command is removed from the namespace queue and the number of tokens for that namespace queue is reduced by a number of tokens corresponding to the calculated power consumption for that command. When the namespace queue for the command does not currently have the threshold amount of tokens needed, in other words has an insufficient number of tokens for the determined power consumption of the command, then execution is delayed until the namespace tokens are refreshed. In one implementation, the tokens may be refreshed at regular interval, for example on the order of every millisecond. Any of a number of periodic token refresh rates suitable for the particular memory device type or application are contemplated. It should be appreciated that, in one embodiment, the fetching of host commands from the submission queue(s) is not delayed because the application of resource management for QoS purposes is handled by controlling timing execution of commands queued in the namespace queues 810 after the commands have already been fetched from the submission queue(s).

In one example, continuing with the hypothetical memory device above with two namespaces (NS A with 70% resource allocation and NS B with 30% resource allocation according to the host-configured namespace QoS selections stored in the memory device 800), the controller 802 may utilize its resource allocator 812 and token management module 816 to assign to each namespace a number of tokens at a steady rate, but limit the total number of tokens each namespace can accumulate. In this example, it is assumed that the memory device 800 is allowed to consume 100 milliwatt (mW) of power every 1 millisecond and that each token represents 1 mW. Accordingly, the number of tokens issued to all the supported namespaces (here just NS A and NS B) every 1 millisecond by token management module 816 of the controller 802 may be 100, with 70 assigned to NSA and 30 assigned to NS B.

Because, in one implementation, the tokens are assigned to the supported namespaces every time period and the memory device may be idle for a period of time that spans multiple of those time periods, a maximum token parameter may defined for each namespace. For instance, the token management module 816 and resource allocator 812 may configure a maximum token value for each namespace. In this two namespace example, the max token value may be 1000 tokens for NS A and 300 tokens for NS B. When the number of tokens for a namespace reaches the max token value that has been set for that namespace, no further tokens are assigned to that namespace until the total for that namespace falls below its respective max token value. This configuration makes sure that the available tokens for each namespace will never exceed those maximum values. This will avoid problems where the memory device is consuming a relatively high amount of power in a specific time and then becomes idle and stays in an idle state for a long time (for example when no host commands are pending).

In alternative embodiments, each namespace queue may be associated with a resource specific token based on a resource other than equivalent power consumption. In yet other alternative embodiments, each namespace may be associated with separate tokens for more than one type of resource. For example, instead of converting all the different resources, such as the number of lower level NAND commands and the number of data buffers needed, into a power equivalent and generating a single score, each namespace may be assigned different resource-specific tokens for each of a set number of resource types. The process of FIG. 9 would then be modified slightly to require that, at step 912, a separate resource score is generated for each resource type that has a separate token. Similarly, at step 914, sufficient tokens of each different resource type for which tokens are provided would need to be available to satisfy each separate resource score for the command before that namespace could execute the command.

In yet other alternative embodiments, rather than performing a detailed and customized evaluation of the specific resources needs of each command, where all of the particulars of a command may require multiple lookups to determine the total resources needed for that particular command, a prediction-assisted resource allocation may be implemented. In this alternative resource consumption calculation, the controller of the memory device may create a log of calculated resource consumption for a series of received commands. The log of calculated consumption for prior commands may be stored and used to update a command classification model offline, for example during memory device idle times. In one example, multiple template commands may be created and the resource consumption characterized for those multiple template commands. The template commands may be differentiated by namespace ID range, command length and/or other criteria and the resource consumption scores updated at idle time so that, whenever a new command arrives, its parameters (namespace ID range, command length, etc.) will be matched with the closest one of the templates and assigned the pre-calculated resource consumption score for that template. This may provide a reasonable estimate of resource consumption score and avoid the more time consuming effort of characterizing and scoring the actual resource consumption for a large number of different parameters in every command.

Figure 11:
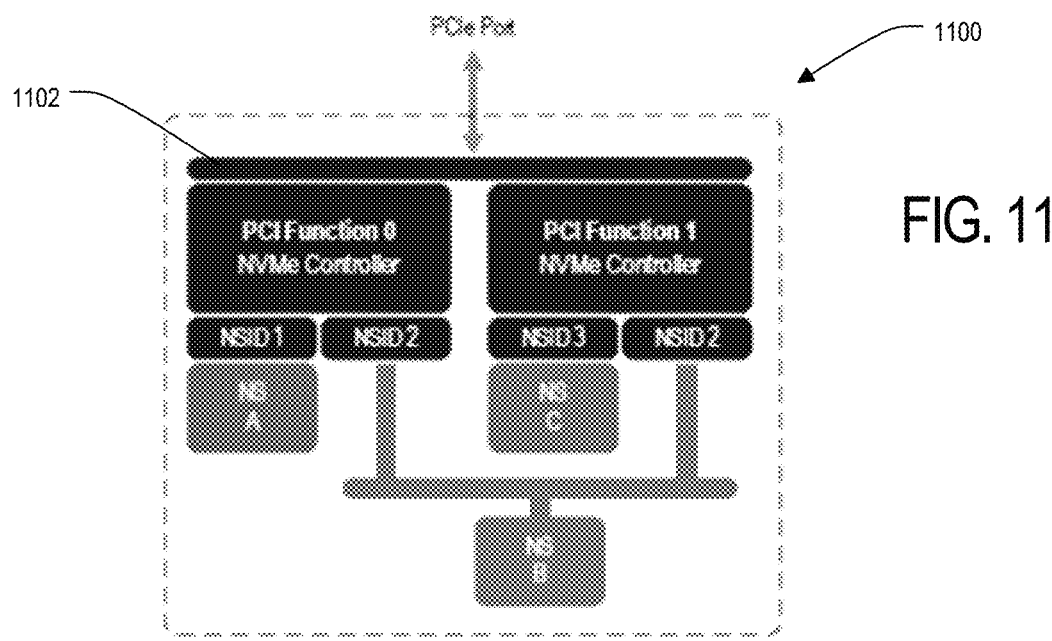
FIG. 11 is an alternative NVMe configuration to the NVMe implementation of FIG. 5.

The methods and system of managing a multi-namespace memory device to control QoS described above may be applied to any of a number of different NVMe configurations of memory devices and not just the single PCIe port with single NVMe controller of FIG. 5. For example, in FIG. 11, a version of a memory device 1100 with a single PCIe port and two separate NVMe controllers is shown. The single PCIe port includes one controller associated with PCI Function 0 and the other controller associated with PCI Function 1. The two controllers each have a single private namespace (NS A and NS C, respectively) and have access to shared namespace B (NS B). The namespace ID is the same in all controllers that have access to a particular shared namespace. In this example, both controllers use namespace ID 2 (NSID2) to access shared NS B. The existence of the shared namespace necessitates a separate QoS control function 1102 that communicates with the PCIe port and with both of the controllers. Because the memory device resources are shared by all of the namespaces, shared or private, placing the QoS control function in communication with both controllers and requiring the controllers to follow a single resource allocation model dictated by the QoS control function is necessary. All of the performance advertisement, namespace performance configuration and resource consumption and allocation steps described above may be implemented in the QoS controller in the same manner as described for implementation of the namespace management module 112 (FIG. 1) in the single NVMe controller embodiment of FIG. 5.

Figure 12:
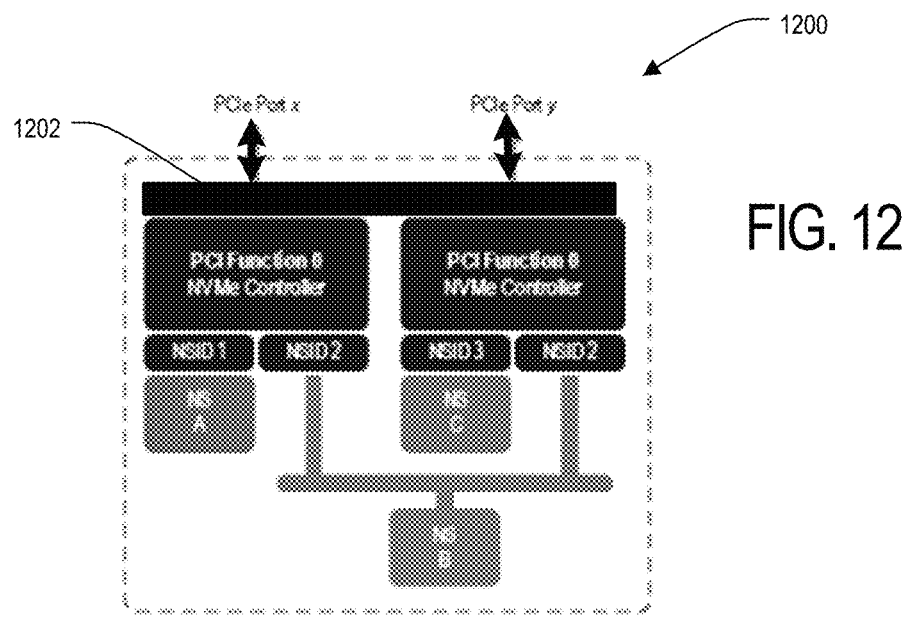
FIG. 12 is a second alternative NVMe configuration to the NVMe implementation of FIG. 5.

Similarly, in the variation of FIG. 12 an NVM subsystem 1200 with two PCIe ports, each with an associated controller, is shown. Both controllers map to PCI Function 0 of the corresponding port. Each PCIe port in this example is completely independent and has its own PCIe Fundamental Reset and reference clock input. A reset of a PCIe port only affects the controller associated with that PCIe port and has no impact on the other controller, shared namespace, or operations performed by the other controller on the shared namespace. However, in order to implement both the shared namespace (NS B) and share memory device resources across all the namespaces as described above, QoS logic 1202 such as described for FIG. 11 is also added between the NVMe controllers and the PCIe ports to permit coordination and follow a single resource allocation model as described above.

Figure 13:
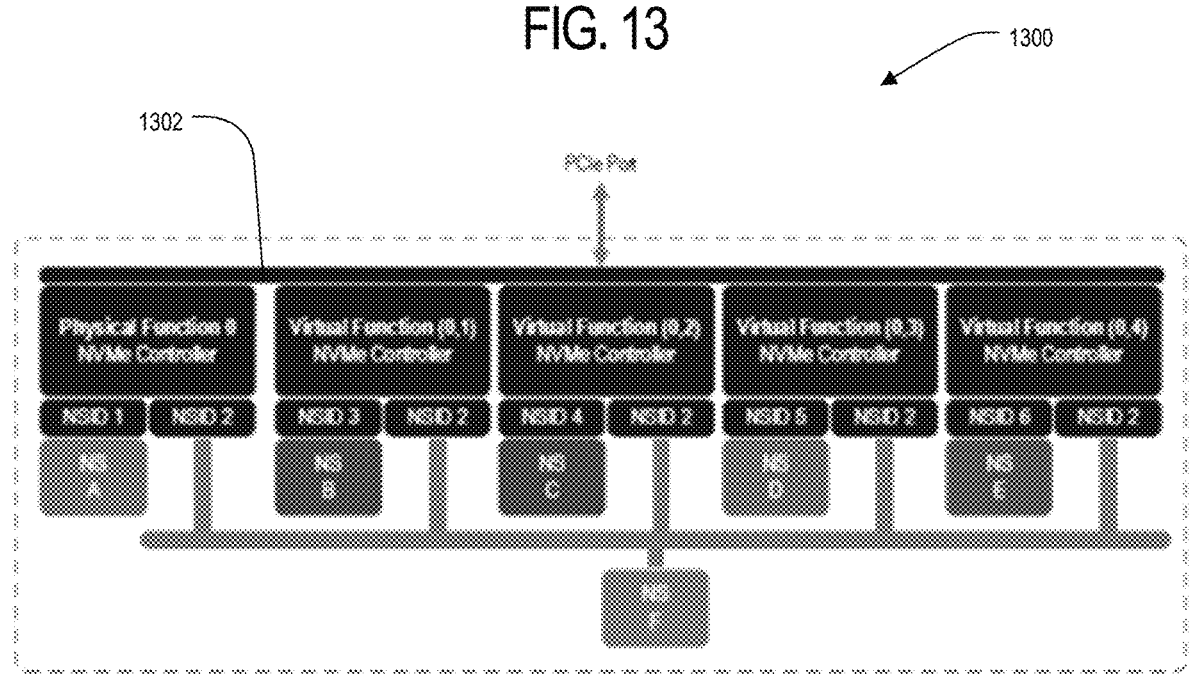
FIG. 13 is a third alternative NVMe configuration to the NVMe implementation of FIG. 5.

In yet another alternative embodiment, the NVMe implementation of FIG. 13 may be configured to implement the performance based resource allocation scheme described above. In FIG. 13, an NVM subsystem 1300 is shown that supports Single Root Input-Output (I/O) Virtualization (SR-IOV) and has one Physical Function and four Virtual Functions. An NVMe controller is associated with each Function with each controller having a private namespace and access to a namespace shared by all controllers, labeled NS F. Again to implement QoS based on namespace partitions where the resources are shared and performance on a namespace level is guaranteed, a QoS function 1302 is shown between the single PCIe port and the various NVMe controllers for the physical and virtual functions.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), phase-change memory ("PCM"), or other elements comprising semiconductor or other material capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to control quality of service for a host command, the method comprising:
   in a memory device comprising a memory:
      advertising namespace performance capabilities to a plurality of hosts in response to receipt of namespace identification queries from the plurality of hosts;
      receiving namespace configuration messages from the plurality of hosts based on the namespace performance capabilities advertised to the plurality of hosts, each namespace configuration message having a plurality of namespace identifiers and respective performance parameters associated with each of the namespace identifiers;
      formatting the memory in a plurality of namespaces based on the namespace configuration messages received from the plurality of hosts, each namespace being associated with a different host of the plurality of hosts and comprising a plurality of logical blocks;
      fetching a host command from a submission queue;
      determining a namespace associated with the fetched command by determining which host of the plurality of hosts is associated with the fetched command;
      queuing the fetched command in a selected namespace queue in a plurality of namespace queues in the memory device, wherein the selected namespace queue is exclusively associated with the determined namespace and with the determined host;
      determining a resource usage amount for a queued command in the selected namespace queue;
      responsive to the determined resource usage amount being within a resource amount currently available for the selected namespace queue, executing the queued command; and
      responsive to the determined resource usage amount for the queued command exceeding the resource amount currently available, delaying execution of the fetched command until the resource amount currently available for the selected namespace queue is greater than or equal to the determined resource usage amount for the queued command.

2. The method of claim 1, wherein the determined resource usage amount is based on at least one memory device performance resource other than bandwidth.

3. The method of claim 1, wherein the determined resource usage amount is determined by an amount of power that is consumed by use of a resource.

4. The method of claim 3, wherein the resource comprises a NAND operation required during execution of the queued command.

5. The method of claim 3, wherein the resource further comprises a data security requirement associated with execution of the queued command.

6. The method of claim 3, wherein the resource further comprises an error correction operation associated with execution of the queued command.

7. The method of claim 3, wherein determining the namespace associated with the fetched command comprises the memory device identifying a host-assigned namespace identifier associated with the retrieved command.

8. The method of claim 3, wherein:
   each of the plurality of namespaces of the memory device is associated with a respective host-designated quality of service (QoS) level represented by a respective portion of a total available power consumption supported by the memory device;
   the memory device assigns resource tokens representative of a unit of the total available power consumption to each of the plurality of namespace queues in proportion to the respective host-designated QoS level associated with each namespace queue;
   each queued command executed from a namespace queue consumes an amount of resource tokens assigned to that namespace queue corresponding to an amount of power needed to execute the queued command; and
   the memory device determines the resource amount currently available for the selected namespace queue based on a number of resource tokens remaining for the selected namespace queue.

9. The method of claim 8 wherein:
   the memory device periodically refreshes the amount of resource tokens for each of the plurality of namespace queues; and
   delaying execution of the queued command until the resource amount currently available for the selected namespace queue is greater than or equal to the determined resource usage amount for the queued command comprises delaying execution until the memory device refreshes the amount of resource tokens for the selected namespace queue.

10. A memory device comprising:
    a memory comprising a submission queue; and
    a controller in communication with the memory, the controller configured to:
       advertise namespace performance capabilities to a plurality of hosts in response to receipt of namespace identification queries from the plurality of hosts;
       receive namespace configuration messages from the plurality of hosts based on the namespace performance capabilities advertised to the plurality of hosts, each namespace configuration message having a plurality of namespace identifiers and respective performance parameters associated with each of the namespace identifiers;

format the memory in a plurality of namespaces based on the namespace configuration messages received from the plurality of hosts, each namespace being associated with a different host of the plurality of hosts and comprising a plurality of logical blocks;

retrieve a command from the submission queue;

insert the retrieved command into one namespace queue of a plurality of namespace queues in the memory device based on a namespace identifier associated with the retrieved command, wherein the namespace identifier identifies which host of the plurality of hosts is associated with the command;

determine, based on memory device resources assigned to a particular namespace queue of the plurality of namespace queues, whether to delay execution of a command in the particular namespace queue;

responsive to determining to delay execution of the command, delay processing of the command until a threshold amount of memory device resources is available to the particular namespace queue; and after the threshold amount of memory device resources is available to the particular namespace queue, execute the command.

11. The memory device of claim 10, wherein:

each of the plurality of namespace queues is associated with a respective host-selected quality of service (QoS);

the host-selected QoS comprises a respective portion of memory device resources of a total amount of memory device resources; and a QoS for a first of the plurality of namespaces differs from a QoS for second of the plurality of namespaces.

12. The memory device of claim 10, wherein the controller is configured to delay processing of the command until the threshold amount of memory device resources are available to the particular namespace queue by:

periodically allocating additional memory device resources to the particular namespace queue; and in response to determining that the allocated additional memory device resources exceed the threshold amount, processing the command.

13. The memory device of claim 12, wherein the threshold amount comprises an amount of memory device resources greater than or equal to an amount of memory device resources calculated to be consumed by execution of the command.

14. The memory device of claim 10, wherein the memory device resources are based on at least one memory device performance feature other than bandwidth.

15. The memory device of claim 10, wherein the memory device resources are determined by an amount of power that is consumed by use of a resource.

16. The memory device of claim 15, wherein the resource comprises at least one of a NAND operation, a data security operation or an error correction operation required during execution of the queued command.

17. A non-volatile memory device comprising:

a non-volatile memory; and a controller in communication with the non-volatile memory, the controller configured to:

in response to receipt of a namespace identification query from a host, advertise namespace performance capabilities to the host;

receive a namespace configuration message from the host based on the namespace performance capabilities advertised to the host, the namespace configuration message having a plurality of namespace identifiers and respective performance parameters associated with each of the namespace identifiers;

format the memory in a plurality of namespaces based on the namespace configuration messages received from the plurality of hosts, each namespace being associated with a different host of the plurality of hosts and comprising a plurality of logical blocks;

retrieve a host command from a submission queue;

place the retrieved host command having into a namespace queue associated with a namespace identifier provided for the host command, wherein the namespace identifier identifies which host of the plurality of hosts is associated with the fetched command;

determine an amount of memory device resources necessary to execute a host command at a head of the namespace queue associated with the namespace identifier; and execute the host command at the head of the namespace queue responsive to an amount of memory device resources currently available to the namespace queue exceeding the amount of memory device resources necessary to execute the host command.

18. The non-volatile memory device of claim 17, wherein to determine the amount of memory device resources necessary, the controller is configured to identify each type of individual memory device resources that will be used to execute the host command at the head of the namespace queue and convert each type of individual memory resource used into a total resource score representative of a total amount of memory device resources needed to execute the host command.

19. The non-volatile memory device of claim 18, wherein:

types of individual memory device resources comprise a number of memory buffers, a number of NAND operations, a type of error correction code (ECC) operation, a type of data security or an amount of bandwidth needed for executing the host command; and the controller is configured to convert each type of individual memory resource needed for executing the host command into an equivalent power consumption value.

20. A non-volatile memory device comprising:

a non-volatile memory; and a controller in communication with the non-volatile memory, the controller comprising:

means for advertising namespace performance capabilities to a plurality of hosts in response to receipt of namespace identification queries from the plurality of hosts;

means for receiving namespace configuration messages from the plurality of hosts based on the namespace performance capabilities advertised to the plurality of hosts, each namespace configuration message having a plurality of namespace identifiers and respective performance parameters associated with each of the namespace identifiers;

means for formatting the memory in a plurality of namespaces based on the namespace configuration messages received from the plurality of hosts, each namespace being associated with a different host of the plurality of hosts and comprising a plurality of logical blocks;

means for queuing a host command into one of a plurality of namespace queues in the non-volatile memory device;

means for determining memory device resources needed to execute a command in the one of the plurality of namespace queues by determining which host of the plurality of hosts is associated with the fetched command; and means for managing execution of the commands in the one of the plurality of namespace queues based on a host-defined portion of memory resources allocated to each of the plurality of namespace queues.

* * * * *